United States Patent Office

3,334,962
Patented Aug. 8, 1967

3,334,962
PROCESS FOR THE PRODUCTION OF CUBIC CRYSTALLINE ZIRCONIA
Abraham Clearfield, Niagara Falls, N.Y., assignor to National Lead Company, New York, N.Y., a corporation of New Jersey
No Drawing. Filed Oct. 8, 1962, Ser. No. 229,166
10 Claims. (Cl. 23—24)

This invention relates to zirconium oxide and is particularly concerned with zirconium oxide which exhibits crystallinity in the cubic system.

Most of the zirconium oxide of commerce is obtained by high temperature reduction of zircon with carbon. In the absence of a stabilizing agent, the most common being calcium oxide, such zirconia is monoclinic at ordinary temperatures.

Some zirconia is also produced by precipitating the hydrous oxide from an aqueous solution of a zirconium salt with an alkaline solution and calcining the hydrous oxide. As precipitated according to known practise, the hydrous zirconium oxide is amorphous, examination by X-ray diffraction or electron diffraction giving no indication of a crystalline structure. This is true regardless of the water content of the hydrous zirconia, which may vary from 95% to about 10%. Approximately the latter amount is ordinarily retained unless the product is dried at a temperature above 100° C. Upon calcination the hydrous oxide continues to lose water and at about 420° C. crystallizes in the monoclinic system. This crystalline form is maintained as calcination temperatures are increased to well above the temperature, 900° C.–1000° C., at which the last water is driven off and the zirconia is anhydrous.

The present invention has as an object the production of novel, cubic crystalline zirconium oxide.

Another object of the invention is to produce novel hydrous crystalline, cubic zirconia.

A further object of the invention is to produce a novel, hydroxylated, cubic zirconium oxide.

Another object of the invention is to provide processes for producing hydrous, crystalline, cubic zirconia and hydroxylated, cubic zirconia.

Another object of the invention is to provide a process for producing novel stabilized zirconia products.

Still another object of the invention is to produce a novel glass polishing agent.

A further object of the invention is to provide a novel method for producing stabilized, sintered, refractory zirconia products.

Other objects and advantages of the invention will be apparent from the following description thereof.

It has been discovered that strong aqueous solutions of alkalies, such as alkalimetal hydroxides and carbonates, at temperatures above about 30° C., influence the normally amorphous hydrous zirconium oxide to a cubic crystalline form. As hereinafter described in more detail, variations in condition such as alkalinity, temperature, and time of contact determine the extent to which the cubic crystalline form is assumed by the hydrous zirconia.

In carrying out the present invention the hydrous zirconia may be precipitated under strongly alkaline conditions or, alternatively, hydrous zirconia produced in conventional manner, by precipitation with ammonium hydroxide or weak solutions of other alkalies, may be treated with strong hot solutions of alkalies. In Examples 1 to 3, inclusive, the direct production of cubic crystalline hydrous zirconia is illustrated.

Example 1

An aqueous solution containing 33.9 g. of $ZrOCl_2 \cdot 8H_2O$ in 30 ml. of water was added with stirring to a hot solution of 30 g. of NaOH in 10 ml. of water. The resultant slurry was boiled (at about 130° C.) for 2 hours, filtered, and washed. Then, after reslurrying the filter cake in 50 ml. of water, the pH of the slurry was reduced to 6.7 with 6 N HCl and the precipitate was washed free of NaCl and dried at 100° C. The product was a very pure hydrous zirconia containing 16% $H_2O$, spectrographic analysis showing only 0.7% $SiO_2$ and no more than 0.005% of any other metallic impurity. Examination of the damp product by X-ray diffraction showed a strong pattern characteristic of cubic zirconia. A sample of the product heated to 600° C. also showed only the characteristic X-ray diffraction pattern of cubic zirconia.

Example 2

An aqueous solution containing 35.5 g. of $$Zr(SO_4)_2 \cdot 4H_2O$$

in 50 ml. of water was stirred into 50 g. of NaOH in 50 ml. of water. The slurry thus obtained was boiled for 2 hours, (the temperature being about 115° C.), and was then filtered, washed free of sodium sulfate, and dried at 60° C. When examined by X-ray diffraction the damp hydrous zirconia product showed the characteristic pattern of cubic zirconia and a sample of the product after calcination to 600° C. showed this pattern only.

Example 3

A quantity of hydrous zirconium carbonate containing the equivalent of 8.5 g. of $ZrO_2$ was stirred into a solution of 50 g. of NaOH in 50 ml. of water. The resultant slurry was boiled for ¼ hour (the temperature being about 115° C.). It was then filtered, washed, and air dried. Samples of the damp hydrous zirconia product as well as of the product after calcination to 600° C. when examined by X-ray diffraction showed only a pattern characteristic of cubic zirconia.

Example 4

50 g. of amorphous hydrous zirconia was stirred into a solution of 8.2 g. of NaOH in 8.3 ml. of water and heated for 2 hours at 96° C. After filtering and washing the resultant slurry, a portion of the hydrous zirconia product was examined by X-ray diffraction and found to have a pattern characteristic of cubic zirconia.

Example 5

50 g. of amorphous hydrous zirconia was added to a boiling solution of 40 g. of $Na_2CO_3$ in 100 ml. of water and refluxed for 1 hour, the temperature being about 105° C. After filtering and washing, a portion of the hydrous zirconia product was examined by X-ray diffraction and found to show no pattern of crystallinity. However, upon reexamination after it was calcined to 600° C., it was found to have only the pattern characteristic of cubic zirconium oxide.

In connection with the foregoing examples, it is to be noted that when hydrous zirconium oxide is examined by X-ray diffraction using a direct recording diffractometer, reflection peaks are found if the material is definitely crystallized. Hydrous zirconia prepared under some conditions, such as those of Example 5, when so examined appears to be amorphous although it is in fact cryptocrystalline in whole or in part. In such products the crystallites are so small as to be undetectable by X-ray diffraction techniques. However, upon heating, the minute crystallites so increase in size that they are detectable by X-ray diffraction. It has been determined that reversion or transformation of cubic crystalline zirconia to the monoclinic form starts to take place at about 695° C. Consequently, when cryptocrystalline, hydrous, cubic zirconia is calcined to temperatures below this transformation point, the crystal habit or form of the zirconia is not changed but merely made perceptible.

In the following table there are listed the characteristic reflections in the X-ray diffraction patterns of cubic zirconium oxide and the novel crystalline hydrous cubic zirconia and hydroxylated cubic zirconia of the present invention.

TABLE A

| (1) | | (2) | | (3) | |
|---|---|---|---|---|---|
| d(A.) | $I/I_0$ | d(A.) | $I/I_0$ | d(A.) | $I/I_0$ |
| 2.96 | 100 | 2.95 | 100 | 2.96 | 100 |
| 2.56 | 24 | 2.56 | 25 | 2.56 | 25 |
| 1.81 | 80 | 1.80 | 40 | 1.81 | 50 |
| 1.54 | 60 | 1.54 | 30 | 1.54 | 28 |
| 1.48 | 10 | | | 1.48 | 8 |

In Table A (1) is cubic zirconia and the data are those given by the standard A.S.T.M. card index, (2) is precipitated hydrous, crystalline, cubic zirconia, and (3) is hydroxylated cubic zirconia prepared by calcining hydrous, crystalline, cubic zirconia at 600° C. for 2 hours, the data for (2) and (3) being determined with a General Electric XRD3 X-ray diffraction unit and diffractometer. The $I/I_0$ columns show the relative intensities of the reflections.

It will be evident from the table that the crystal patterns of the three products are substantially identical, the minor variations reflecting only differences in factors such as technique and crystallite size.

When conditions are such that the hydrous zirconia is incompletely transformed to the cubic crystalline or cryptocrystalline state, the portion of the product that remains amorphous will give no X-ray diffraction peaks. However, when such a product is heated, for example to 600° C., the amorphous portion thereof crystallizes as ordinary monoclinic zirconia in admixture with the crystalline cubic zirconia and the monoclinic product is detectable by X-ray diffraction. It will be evident that in the foregoing examples, since no monoclinic zirconia is shown in the products calcined to 600° C., the conversion to crystalline or cryptocrystalline hydrous zirconium oxide is essentially complete.

As indicated above, hydrous zirconia retains a considerable amount of water, at least about 10%, even when dried at 100° C. On heating it to progressively higher temperatures the amount of retained water continues to decrease until at a temperature of about 350° C., it amounts to only about 3–9%. When calcined at temperatures of 500° C.–800° C. crystalline products are obtained which are essentially zirconium dioxide and may be used as such for many purposes. However, such crystalline products still have an $H_2O$ content of the order of 5%–0.1%. This water is believed to be present as hydroxyl groups attached to zirconium atoms and is so tenaciously held thereon that it can only be completely removed by calcination to temperatures of 900° C. or higher. In order to distinguish such crystalline zirconia products from anhydrous zirconium oxide they are referred to by some workers in the art as "hydroxylated" zirconia. Thus, the product in each of Examples 1–3, inclusive, and 5, obtained by calcination of the hydrous product to 600° C. is hydroxylated cubic zirconia. When reduced to a powder it is free flowing and regardless of whether the $H_2O$ is present as combined water or hydroxyl ions is, as shown, metastable.

As pointed out above, in Examples 1–5, inclusive, the conditions employed were such that substantially all of the hydrous zirconia product was crystalline or cryptocrystalline in the cubic system. As indicated in the examples, it has been found that the hydrous zirconia, for complete conversion to the cubic crystalline form must be subjected to an alkali solution having a pH of at least 12.5. Solutions having pH values greater than 14 are satisfactory and, indeed, in some cases preferably since the time of contact required for complete conversion of the amorphous hydrous zirconia to the crystalline cubic form may be decreased. The time period required for complete conversion varies with the pH of the alkali solution and the temperature. At boiling temperature the time will range from about 15 minutes to 2 hours. While temperatures as low as about 50° C. may be employed, the time required at low temperatures for development of cubic crystallinity is so long (at least about 48 hours at 50° C. and a pH of 14) that temperatures of about 100° C. and above are preferred.

Where conditions are such that the hydrous zirconia is not wholly converted to crystalline or cryptocrystalline cubic form, a substantial portion may be so converted. This is shown in the following examples:

*Example 6*

To a boiling solution of 40 g. of NaOH in 50 ml. of water there was added, with stirring, a 32% aqueous solution of $ZrOCl_2$ until the pH of the slurry was 8.4. The precipitate was filtered off and washed free of NaCl. A portion of the damp hydrous zirconium oxide product was examined by X-ray diffraction and found to have the pattern characteristic of cubic zirconia. However, upon calcination at 600° C. for 2 hours, the hydroxylated zirconia product was found by X-ray diffraction to be crystallized, approximately half in the cubic system and half in the monoclinic system. Thus, approximately half of the hydrous zirconia was before calcination either cubic crystalline or cryptocrystalline.

*Example 7*

125 g. of amorphous hydrous zirconia precipitated with ammonia was slurried in 120 ml. of water. An aqueous solution of NaOH was stirred into the slurry until the pH thereof was 12.5. Then the slurry was refluxed for 1 hour. After filtering and washing, a sample of the hydrous zirconia when examined by X-ray diffraction showed no crystallinity. However, after calcination to 600° C. reexamination showed that 18% of the solid exhibited the pattern characteristic of cubic zirconia while 82% showed a monoclinic crystallization. This indicates that 18% of the hydrous oxide, after treatment with the NaOH at pH 12.5 was cryptocrystalline in the cubic system.

Depending upon conditions, the proportion of hydrous zirconia, produced or treated in accordance with the present invention, which is crystalline or cryptocrystalline in the cubic system, may vary from a trace to 100%. As indicated above, the formation of cubic crystalline hydrous zirconia is favored by prolonged exposure to boiling temperatures at high pH. Use of alkali solutions of lower pH and heating at lower temperatures and/or for short periods of time result in incomplete conversion to crystalline or cryptocrystalline cubic form. It appears that incomplete conversion is obtained at alkalinities of pH 12.5 or lower unless excessively long periods of boiling are employed. Similarly, if temperatures substantially lower than about 100° C. are used except where the pH of the alkali solution is about 14 or higher, very long heating periods are required to produce hydrous zirconia which is wholly converted to the cubic crystalline form.

The relative effects of pH and time may be observed from the following examples:

Example 8

A concentrated solution of NaOH was added, with stirring, to a slurry of hydrous zirconia (containing the equivalent of 25 g. of $ZrO_2$ in 100 ml. of water) until the slurry had a pH of 9.0. The slurry was then boiled with refluxing for a period of 22 hours. At intervals, portions of the slurry were withdrawn and dried at 100° C. On examination by X-ray diffraction, none of the several portions showed evidences of crystallinity. However, when reexamined after calcination at 600° C. for 2 hours, a part of each portion was found to be crystalline with the pattern of cubic zirconia. The results are shown in Table B below:

TABLE B

| Reflux Time in Hours | Crystallinity (percent) | |
|---|---|---|
| | Cubic | Monoclinic |
| 1 | 13 | 87 |
| 2 | 15 | 85 |
| 3 | 33 | 67 |
| 22 | 45 | 55 |

Example 9

The alkali-treating procedure of Example 8 was repeated except that enough concentrated sodium hydroxide solution was added to the hydrous zirconia slurry to raise the pH to 12.0. After refluxing the slurry for 1 hour the hydrous zirconia was dried at 100° C. and found to be amorphous by X-ray diffraction. However, on calcination at 600° C. for 2 hours the product was found to be crystalline with 20% being cubic. It is evident, therefore, that at a pH of 12 the conversion to cryptocrystalline, hydrous, cubic zirconia is much faster than at a pH of 9.

The hydrous, crystalline, cubic zirconia produced in accordance with the present invention has characteristics which are materially different from those of amorphous hydrous zirconia. As noted above, the X-ray diffraction patterns are different. In addition, the curves obtained by differential thermal analysis are different. The most striking difference is that at 420° C. In the case of amorphous zirconia there is found at this temperature an exothermic peak that is the result of crystallization. If the product is 100% cubic crystalline there is no maximum at that temperature while hydrous zirconia less than 100% cubic crystalline shows a maximum which is proportional to the percentage of amorphous hydrous zirconia present. As the temperature is increased, it is found that hydrous, cubic zirconia shows a broad, low-intensity maximum at about 800° C. as a result of inversion to the monoclinic form. It has also been observed that hydrous, crystalline, cubic zirconia has adsorption characteristics which differ from those of amorphous hydrous zirconia.

As a result of such differences, hydrous, crystalline, cubic zirconia, although useful for the same purposes as the amorphous product, has advantages for certain purposes such as catalysis and selective adsorption, as, for example, in chromatography.

A chromatographic use of hydrous, crystalline, cubic zirconia is given in the following example:

Example 10

Purification of the dye, paraphenylazophenol to free it from any basic anilino derivatives present is accomplished by dissolving the dye in a non-polar solvent such as benzene and passing the solution through a column packed with hydrous, cubic zirconia such as that obtained by the procedure of Example 1 which has been calcined at about 300° C. to eliminate most of the water. A column formed in a glass tube ½ in. x 18 in. may be used conveniently, the dye solution being poured in the top of the column as fast as it flows out. The dye is substantially completely adsorbed by the hydrous cubic zirconia while the anilino derivatives remain in the effluent. After washing the mass with benzene, the purified dye is recovered by elutriating the mass with a polar solvent such as acetone and thereafter evaporating the solvent. Very clean dye crystals are obtained.

The selective adsorption characteristics of the crystalline, hydrous, cubic zirconia demonstrated in the preceding example are also found in the cryptocrystalline, hydrous, cubic zirconia described above. On the other hand amorphous hydrous zirconia adsorbs not only the paraphenylazophenol but also the associated anilino derivatives. For some uses, however, such as for example the manufacture of zirconia chemicals, the crystalline and cryptocrystalline hydrous cubic zirconia and mixtures of amorphous hydrous zirconia with either or both of them may be used interchangeably with amorphous hydrous zirconia.

In addition to the foregoing uses, the hydrous, crystalline and cryptocrystalline, cubic zirconium dioxide products of the present invention are very useful in the production of stabilized zirconia refractory products. As is well known, monoclinic zirconia refractories are subject to excessive cracking and spalling during heating and cooling cycles because of the expansion occurring during the transformation at 1170° C. of the high temperature tetragonal form of the oxide to the monoclinic form. To prevent such spalling and cracking the zirconia is stabilized in the cubic form. Hitherto, stabilized zirconia has usually been prepared by calcining together monoclinic crystalline zirconia and a small amount of a stabilizing agent at a temperature above 1200° C., usually 1400° C.–1600° C. The monoclinic zirconium oxide is transformed at such temperatures to the cubic form and the stabilizing agent, CaO or $Y_2O_3$ for example, form a solid solution therewith.

It has been found that the hydrous, crystalline or cryptocrystalline, cubic zirconia of the present invention when mixed with a stabilizing agent, as, for example, by coprecipitation, may be heated above 695° C. without change or inversion to the monoclinic form. In fact, the zirconia is permanently held in the cubic form and may be repeatedly heated from room temperature to above 1500° C. without inversion. The following examples illustrate the production of stabilized hydrous, cubic zirconia.

Example 11

A solution of 67 g. zirconyl chloride ($ZrOCl \cdot 8H_2O$) and 8.65 g. of $YCl_3 \cdot 6H_2O$ in 100 ml. of water was prepared. After filtering to remove insolubles, the solution was stirred into a solution of 22 g. of NaOH in 50 ml. of water. The slurry of coprecipitated hydrous oxides of zirconium and yttrium formed was heated for ½ hour at 110° C. and was then filtered and washed free of alkali. Upon examination by X-ray diffraction, the hydrous product exhibited the crystal pattern characteristic of cubic zirconia. When portions of this hydrous, crystalline, cubic zirconia were calcined to 300° C., 600° C., 900° C., 1200° C., and 1450° C., it was found that the cubic crystalline form was maintained in each case. After cooling, it was found that the X-ray diffraction pattern of each portion was still that of cubic zirconium oxide and that the portions calcined to 900° C., 1200° C., and 1450° C. were completely stabilized.

Example 12

A mixture of 53.6 g. of zirconyl chloride $$(ZrOCl_2 \cdot 8H_2O)$$

and 5.87 g. of $CaCl_2 \cdot 2H_2O$ was dissolved in 100 ml. of water. After filtering the solution was stirred into a solution of 21 g. of NaOH in 50 ml. of water, additional water being added as necessary to maintain the fluidity of the slurry of coprecipitated hydrous zirconia and calcium hydroxide. The slurry was heated for ½ hour at 100°–105° C., and, after cooling, was filtered and washed free of Cl⁻. A sample of the product was examined by X-ray diffraction and found to have the crystal pattern characteristic of cubic zirconia. Like the product of Example 11, the hydrous, crystalline cubic zirconia product of this example retained its cubic crystallinity during calcination through the temperature range from 100° C. to 1450° C. and the product was completely stabilized.

The products of Examples 11 and 12 are of particular interest and use in ceramics. Stabilized cubic zirconia products as previously prepared by calcining together monoclinic zirconium oxide and a stabilizing agent are coarsely crystalline, high sintered materials that are rather difficult to mill. On the other hand, the novel coprecipitated products of Examples 11 and 12 are finely divided and the crystallites of the particles are of small size. By calcining the precipitated products under properly chosen conditions their density and water content may be so varied that an unusually wide range of shrinkage characteristics may be obtained in ceramic bodies formed from them. Thus, new ceramic techniques are available to the industry. An example of the use of such novel stabilized cubic zirconia is shown in:

*Example 13*

A quantity of the product formed by coprecipitation in accordance with Example 11 was calcined at 1200° C. for 2 hours and was then milled in a vibro energy mill to a fineness such that all particles were less than $3\mu$ in size. Portions of the resultant powder were pressed at 10,000 p.s.i. into setter discs ½ in. in thickness and sintered in a gas-fired kiln for 2 hours at 1650° C. The discs obtained were quite dense, 95%–98% of theoretical and had an 18% shrinkage. They were completely stabilized and showed excellent resistance to cracking and spalling during repeated heating cycles.

Of course, the novel hydrous and/or hydroxylated cubic zirconia, intimately associated with a stabilizing agent as herein described, may be used in admixture with other zirconia, either stabilized or unstabilized, and with hydrous, crystalline or cryptocrystalline, cubic zirconia or the hydroxylated cubic zirconia herein described. Thus, a wide range of compositions is possible and the shrinkage of ceramic articles formed therefrom may be varied widely. It should be noted that for many ceramic uses the zirconia need not be completely stabilized, in some cases 50% stabilization being sufficient so that smaller amounts of stabilizing agent may be employed.

It will be understood that the procedure in Examples 11 and 12 may be varied considerably. Thus, for example, the cubic hydrous zirconia and the stabilizing agent may, if desired, be precipitated separately in the same or different vessels and the mixed precipitates may then be refluxed together. Other suitable methods of obtaining intimate mixtures of hydrous, crystalline or cryptocrystalline, cubic zirconia with stabilizing agents may also be used. Under appropriate conditions other known stabilizing agents, for example the oxides of cerium, magnesium and thorium, may be employed in place of or in addition to CaO and $Y_2O_3$.

The novel, hydroxylated cubic zirconia above described also has distinctive and useful properties. It may be employed as a catalyst or as an adsorbent and is also an excellent glass polishing agent when used in the manner described in U.S. Patent No. 2,934,416, issued Apr. 26, 1960.

As will be evident from the foregoing description, hydrous zirconium oxide may be precipitated from any soluble zirconium salt by well-known procedures. Such precipitation may be carried out with ammonium hydroxide or with an alkali metal or alkaline-earth metal hydroxide. Where, however, the resultant slurry of hydrous zirconia is to be heated at a high pH to convert it to cubic crystalline or cryptocrystalline form, an alkali metal hydroxide or carbonate must be used to permit the raising of the pH of the slurry to at least 9. Similarly, an alkali metal hydroxide or carbonate must be used in converting a previously formed amorphous hydrous zirconia to the cubic crystalline or cryptocrystalline form. Since sodium hydroxide is the cheapest and most convenient alkali metal hydroxide, it is preferred. Potassium hydroxide has been used satisfactorily, however, and other alkali metal hydroxides and carbonates may be employed.

In the foregoing description of the present invention no account has been taken of minor impurities in the zirconium salts or the resulting hydrous and/or hydroxylated zirconia. Further, the few percent of hafnium always associated with zirconium ores and compounds, unless special effort is taken to remove it, has been ignored. Since zirconium and hafnium are unique in that their chemical behaviors are almost identical and are much more alike than those of any other two elements, such hafnium is not ordinarily considered an impurity. In the present case, the hafnium goes through the same transformations as the zirconium.

All percentages specified or referred to herein are percentages by weight.

I claim:

1. A process for producing hydrous, crystalline, cubic zirconia which comprises heating a slurry of amorphous hydrous zirconia in an aqueous solution of a substance selected from the group consisting of alkali metal hydroxides and alkali metal carbonates, said slurry having a pH of at least 9 and the temperature being at least 50° C., until said hydrous zirconia exhibits a crystal structure substantially identical with that of cubic zirconia, the period of heating varying inversely with respect to temperature and pH, and thereafter separating said hydrous, crystalline, cubic zirconia from said aqueous solution.

2. A process as set forth in claim 1 in which the pH of said slurry is at least 12.

3. A process as set forth in claim 1 in which the pH of said slurry is at least 14.

4. A process as set forth in claim 1 in which the slurry is boiled.

5. A process as set forth in claim 3 in which said slurry is boiled.

6. A process for producing a hydrous zirconia product characterized in that it may be heated to temperatures above 1200° C. and cooled to ambient temperatures without formation of monoclinic zirconia which comprises providing in an aqueous solution of a substance selected from the group consisting of alkali metal hydroxides and alkali metal carbonates a slurry of coprecipitated zirconia and a stabilizing agent therefor, said slurry having a pH higher than 12.5, and heating said slurry at a temperature of at least 50° C. for such a period of time as to convert said hydrous zirconia into cubic crystalline hydrous zirconia, said period varying inversely with respect to the temperature and pH, and thereafter separating said product from said aqueous solution.

7. A process as set forth in claim 6 in which the pH of said slurry is at least 14.

8. A process as set forth in claim 6 in which said slurry is boiled.

9. A process as set forth in claim 6 in which the coprecipitated stabilizing agent is calcium hydroxide.

10. A process as set forth in claim 7 in which said slurry is boiled.

(References on following page)

References Cited

UNITED STATES PATENTS

| | | | |
|---|---|---|---|
| 1,582,126 | 4/1926 | Cooper et al. | 23—24.1 |
| 2,535,526 | 12/1950 | Ballard et al. | 51—309 |
| 2,934,416 | 4/1960 | Harris et al. | 51—309 |
| 2,996,369 | 8/1961 | Harris et al. | 51—309 |
| 3,110,681 | 11/1963 | Meadows et al. | 23—140 X |

OTHER REFERENCES

Azaroff et al.: The Powder Method in X-Ray Crystallography, McGraw-Hill Book Co., Inc., New York, 1958, page 181.

Blumenthal: "The Chemical Behavior of Zirconium," D. Van Nostrand Co., Inc., New York, 1958, pages 151–196 (pages 181–186 of particular interest).

OSCAR R. VERTIZ, *Primary Examiner.*

MAURICE A. BRINDISI, *Examiner.*

H. T. CARTER, *Assistant Examiner.*